(12) United States Patent
Matsuoka et al.

(10) Patent No.: US 10,704,120 B2
(45) Date of Patent: Jul. 7, 2020

(54) METHOD FOR RECOVERING SCANDIUM (71) Applicant: SUMITOMO METAL MINING CO., LTD., Tokyo (JP)

(72) Inventors: Itsumi Matsuoka, Niihama (JP); Hiroshi Kobayashi, Niihama (JP); Yusuke Senba, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 126 days.

(21) Appl. No.: 16/073,946

(22) PCT Filed: Jan. 31, 2017

(86) PCT No.: PCT/JP2017/003398
§ 371 (c)(1),
(2) Date: Jul. 30, 2018

(87) PCT Pub. No.: WO2017/135245
PCT Pub. Date: Aug. 10, 2017

(65) Prior Publication Data
US 2019/0040492 A1    Feb. 7, 2019

(30) Foreign Application Priority Data

Feb. 5, 2016   (JP) ................................ 2016-021174

(51) Int. Cl.
| | | |
|---|---|---|
| *C22B 3/00* | (2006.01) | |
| *C22B 3/42* | (2006.01) | |
| *C22B 3/44* | (2006.01) | |
| *C22B 59/00* | (2006.01) | |
| *C22B 3/32* | (2006.01) | |
| *C22B 3/08* | (2006.01) | |

(52) U.S. Cl.
CPC .............. *C22B 3/42* (2013.01); *C22B 3/0024* (2013.01); *C22B 3/08* (2013.01); *C22B 3/44* (2013.01); *C22B 59/00* (2013.01); *Y02P 10/234* (2015.11)

(58) Field of Classification Search
CPC ........... C22B 3/42; C22B 3/0024; C22B 3/08; C22B 3/44; C22B 59/00; Y02P 10/234
USPC ...................................................... 423/21.5
See application file for complete search history.

(56) References Cited

U.S. PATENT DOCUMENTS

| | | | |
|---|---|---|---|
| 4,626,280 A | | 12/1986 | Vanderpool et al. |
| 4,968,504 A | * | 11/1990 | Rourke ..................... C22B 3/42 423/7 |
| 5,019,362 A | * | 5/1991 | Rourke .................... C01F 17/10 423/21.5 |
| 9,863,018 B2 | * | 1/2018 | Goto ........................ B01J 45/00 |
| 2014/0377150 A1 | | 12/2014 | Goto et al. |
| 2015/0284821 A1 | | 10/2015 | Takano et al. |
| 2016/0010177 A1 | | 1/2016 | Goto et al. |
| 2016/0047014 A1 | | 2/2016 | Ozaki et al. |
| 2016/0340757 A1 | | 11/2016 | Higaki et al. |

FOREIGN PATENT DOCUMENTS

| | | |
|---|---|---|
| CN | 104726724 A | 6/2015 |
| CN | 104995321 A | 10/2015 |
| CN | 105074022 A | 11/2015 |
| EP | 2907883 A1 | 8/2015 |
| JP | 03-173725 A | 7/1991 |
| JP | 09-194211 A | 7/1997 |
| JP | 09-291320 A | 11/1997 |
| JP | 2013-189675 A | 9/2013 |
| JP | 2015-163729 A | 9/2015 |
| WO | 2014/110216 A1 | 7/2014 |
| WO | 2014/118288 A1 | 8/2014 |
| WO | WO 2015/199224 A1 * | 12/2015 |

OTHER PUBLICATIONS

International Search Report dated Mar. 28, 2017, issued for PCT/JP2017/003398.
Office Action dated Jul. 19, 2019, issued in the AU Patent Application No. 2017213939.
Weiwei Wang et al., "Metallurgical processes for scandium recovery from various resources: A review", Hydrometallurgy, Elsevier Scientific Publishing Cy. Amsterdam, NL, vol. 108, No. 1, Mar. 5, 2011, pp. 100-108. (cited in the Jul. 22, 2019 Search Report issued for EP17747401.2).
Extended European Search Report dated Jul. 22, 2019, issued in the EP Patent Application No. 17747401.2.

* cited by examiner

*Primary Examiner* — Steven J Bos
(74) *Attorney, Agent, or Firm* — Locke Lord LLP; James E. Armstrong, IV; Nicholas J. DiCeglie, Jr.

(57) ABSTRACT

The present invention provides a method for easy and efficient recovery of high purity scandium from nickel oxide ore, the method comprising: an adsorption step for passing a scandium-containing solution through an ion exchange resin to adsorb scandium on the ion exchange resin; an elution step for eluting scandium from the ion exchange resin to obtain a post-elution solution; an impurity extraction step in which after the elution step, the scandium-containing solution is subjected to a first solvent extraction using an amine-based impurity extractant and is separated into a first aqueous phase containing scandium and into a first organic phase containing impurities; and a scandium extraction step in which the first aqueous phase is subjected to a second solvent extraction using an amide derivative-containing scandium extractant to obtain a second organic phase containing scandium.

20 Claims, 4 Drawing Sheets

RELATION BETWEEN pH OF EXTRACTION STARTING LIQUID AND EXTRACTION RATE OF METAL IN SCANDIUM EXTRACTION STEP S42

FIG. 5

RELATION BETWEEN CONCENTRATION OF SULFURIC ACID AND BACKWARD EXTRACTION RATE OF Sc IN SCANDIUM BACKWARD EXTRACTION STEP S43

METHOD FOR RECOVERING SCANDIUM

TECHNICAL FIELD

The present invention relates to a method for recovering scandium. More specifically, the present invention relates to a method for simply and efficiently recovering scandium contained in nickel oxide ore by performing multi-stage solvent extraction.

BACKGROUND ART

Scandium is extremely valuable as an additive for high-strength alloys and an electrode material for fuel cells. However, scandium has not yet been used widely due to the small production quantity and high cost thereof.

Meanwhile, a trace amount of scandium is contained in nickel oxide ore such as laterite ore and limonite ore. However, nickel oxide ore has not been industrially used as a raw material for nickel for many years because the grade of nickel contained in nickel oxide ore is low. Consequently, only few studies have been conducted to industrially recover scandium from nickel oxide ore.

However, in recent years, the high pressure acid leach (HPAL) process has been emerging as a practical method, in which nickel oxide ore is introduced into a pressure vessel along with sulfuric acid, and heated at a high temperature of about 240° C. to about 260° C. to allow solid-liquid separation into a leachate containing nickel and a leach residue. In the HPAL process, a neutralizing agent is added to the leachate obtained to separate impurities, and then a sulfurizing agent is added to the resulting leachate from which impurities are separated out, allowing recovery of nickel as nickel sulfide. Subsequently, this nickel sulfide may be subjected to a known nickel refinement process to obtain electrolytic nickel and nickel salt compounds.

In the case of using the HPAL process as described above, scandium contained in nickel oxide ore is contained in a leachate along with nickel (see Patent Document 1). Subsequently, when a neutralizing agent is added to a leachate obtained from the HPAL process to separate impurities, and a sulfurizing agent is then added, nickel is recovered as nickel sulfide while scandium remains in the acidic solution after addition of the sulfurizing agent. In this way, nickel can effectively be separated from scandium by using the HPAL process.

There is also a method in which separation of scandium is performed using a chelating resin (see Patent Document 2). Specifically, in this method disclosed in Patent Document 2, nickel-containing oxide ore is first treated at high temperature and high pressure under an oxidizing atmosphere to selectively leach nickel and scandium into an acidic aqueous solution and an acidic solution is obtained. Subsequently, the pH of the acidic solution is adjusted to the range of 2 to 4, and nickel is then selectively precipitated and recovered as a sulfide using a sulfurizing agent. Next, the resulting solution from which nickel has been recovered is brought into contact with a chelating resin to adsorb scandium to the chelating resin, the chelating resin is washed with a dilute acid, and then the chelating resin after washing is brought into contact with a strong acid to elute scandium from the chelating resin.

Further, as a method for recovering scandium from the acidic solution described above, the method for recovering scandium by means of solvent extraction has also been proposed (see Patent Documents 3 and 4). Specifically, in this method disclosed in Patent Document 3, an organic solvent, in which 2-ethylhexyl sulfonic acid-mono-2-ethyl-hexyl is diluted with kerosene, is first added to a scandium-containing solution of an aqueous phase, which contains one or more of at least iron, aluminum, calcium, yttrium, manganese, chromium, and magnesium in addition to scandium, to extract a scandium component into the organic solvent. Subsequently, in order to separate yttrium, iron, manganese, chromium, magnesium, aluminum, and calcium extracted into the organic solvent along with scandium, an aqueous solution of hydrochloric acid is added to the organic solvent and scrubbing is performed to remove these. Then, an aqueous solution of NaOH is added to the organic solvent to transform scandium remaining in the organic solvent into a slurry containing $Sc(OH)_3$, and this slurry is filtered to obtain $Sc(OH)_3$, which is then dissolved in hydrochloric acid to obtain an aqueous solution of scandium chloride. Then, oxalic acid is added to the resulting aqueous solution of scandium chloride to obtain a precipitate of scandium oxalate. This precipitate is filtered to separate iron, manganese, chromium, magnesium, aluminum, and calcium into a filtrate, and then calcination is performed to obtain high purity scandium oxide.

Moreover, Patent Document 4 describes a method of selectively separating and recovering scandium from a scandium-containing supply liquid, the method including: bringing the scandium-containing supply liquid into contact with an extracting agent at a certain ratio in a batch process.

The grade of scandium recovered according to these methods is known to be about 95% to 98% pure in terms of scandium oxide. The above grade may be good enough for those uses such as an additive in alloys. However, a much higher purity, for example, the purity of about 99.9%, is required as a grade used for electrolytes of fuel cells which have recently much in demand. Otherwise, their full capability may not be obtained.

Patent Document 1: Japanese Unexamined Patent Application, Publication No. H03-173725
Patent Document 2: Japanese Unexamined Patent Application, Publication No. H09-194211
Patent Document 3: Japanese Unexamined Patent Application, Publication No. H09-291320
Patent Document 4: PCT International Publication No. WO2014/110216

DISCLOSURE OF THE INVENTION

Problems to be Solved by the Invention

However, nickel oxide ore described above contains various other impurity elements such as manganese and magnesium in addition to iron and aluminum. In this case, in the chelating resin and the organic solvent disclosed in Patent Document 2 and Patent Document 3, some impurity elements exhibit similarly behavior to that of scandium, and it is difficult to effectively separate and recover such impurity elements from scandium. Further, the impurities such as iron and aluminum contained in the leachate of nickel oxide ore are present at a much higher concentration than scandium, and a suitable method for industrially recovering high purity scandium from nickel oxide ore has not been found since recovery of scandium is also affected by these impurities present in a large amount.

The present invention has been made in view of the above actual circumstances. An object of the present invention is to provide a method for recovering scandium, by which high purity scandium can be simply and efficiently recovered from nickel oxide ore.

Means for Solving the Problems

The present inventors have conducted intensive investigations to solve the problems described above. As a result, the present inventors have found out that high purity scandium can be simply and efficiently recovered from nickel oxide ore by subjecting an acidic solution containing scandium to two-stage solvent extraction of the extraction of impurities using an amine-based impurity extractant and the extraction of scandium using a scandium extractant containing an amide derivative, and thus have completed the present invention. That is, the present invention provides the following.

(1) A first embodiment of the present invention provides a method for recovering scandium, including: an adsorption step of allowing a solution containing scandium to pass through an ion exchange resin to adsorb the scandium to the ion exchange resin; an elution step of allowing a sulfuric acid solution to pass through the ion exchange resin to elute the scandium from the ion exchange resin and to obtain a post-elution solution; an impurity extraction step of subjecting the solution containing scandium to solvent extraction using an amine-based impurity extractant to separate the solution into an aqueous phase containing scandium and an organic phase containing impurities after the elution step; and a scandium extraction step of subjecting the aqueous phase containing scandium to solvent extraction using a scandium extractant containing an amide derivative to separate the aqueous phase into an aqueous phase containing impurities and an organic phase containing scandium.

(2) A second embodiment of the present invention provides the method for recovering scandium according to the first embodiment, further including an enrichment step of enriching the post-elution solution after the elution step, in which the impurity extraction step is performed after the enrichment step.

(3) A third embodiment of the present invention provides the method for recovering scandium according to the first or second embodiment, in which the aqueous phase containing scandium contains trivalent iron as an impurity, the method further includes a reduction step of reducing the trivalent iron contained in the aqueous phase containing scandium to divalent iron after the impurity extraction step, and the scandium extraction step is performed after the reduction step.

(4) A fourth embodiment of the present invention provides the method for recovering scandium according to any one of the first to third embodiments, further including a scandium backward extraction step of subjecting the organic phase containing scandium to backward extraction to obtain a scandium backward extraction liquid.

(5) A fifth embodiment of the present invention provides the method for recovering scandium according to the fourth embodiment, further including: a precipitation step of adding oxalic acid to the scandium backward extraction liquid to precipitate scandium oxalate; and an oxidation step of oxidizing the scandium oxalate to obtain scandium oxide.

(6) A sixth embodiment of the present invention provides a method for recovering scandium, including: an adsorption step of allowing a solution containing scandium to pass through an ion exchange resin to adsorb the scandium to the ion exchange resin; an elution step of allowing a sulfuric acid solution to pass through the ion exchange resin to elute the scandium from the ion exchange resin and to obtain a post-elution solution; a scandium extraction step of subjecting the solution containing scandium to solvent extraction using a scandium extractant containing an amide derivative to separate the solution into an aqueous phase containing impurities and an organic phase containing scandium after the elution step; a scandium backward extraction step of subjecting the organic phase containing scandium to backward extraction to obtain a scandium backward extraction liquid; and an impurity extraction step of subjecting the scandium backward extraction liquid to solvent extraction using an amine-based impurity extractant to separate the scandium backward extraction liquid into an aqueous phase containing scandium and an organic phase containing impurities.

(7) A seventh embodiment of the present invention provides the method for recovering scandium according to any one of the first to sixth embodiments, in which the amide derivative is represented by the following general formula (I).

[Formula 1]

(In the formula (I), $R^1$ and $R^2$ each represent the same alkyl group or different alkyl groups. The alkyl group may be linear or branched. $R^3$ represents a hydrogen atom or an alkyl group. $R^4$ represents a hydrogen atom or an arbitrary group other than an amino group, which is bonded to an α carbon as an amino acid.)

(8) An eighth embodiment of the present invention provides the method for recovering scandium according to any one of the first to seventh embodiments, in which the solution to pass through the ion exchange resin in the adsorption step is an acid solution obtained by leaching nickel oxide ore using sulfuric acid at high temperature and high pressure.

Effects of the Invention

According to the present invention, high purity scandium can be simply and efficiently recovered from nickel oxide ore.

PREFERRED MODE FOR CARRYING OUT THE INVENTION

Below, specific embodiments of the method of recovering scandium according to the present invention will be described in more detail with reference to the drawings, but the present invention shall not be limited to these. The present invention can be implemented with appropriate modifications made without departing from the spirit of the present invention.

First Embodiment

<<1. Method for Recovering Scandium>>

Figure 1:
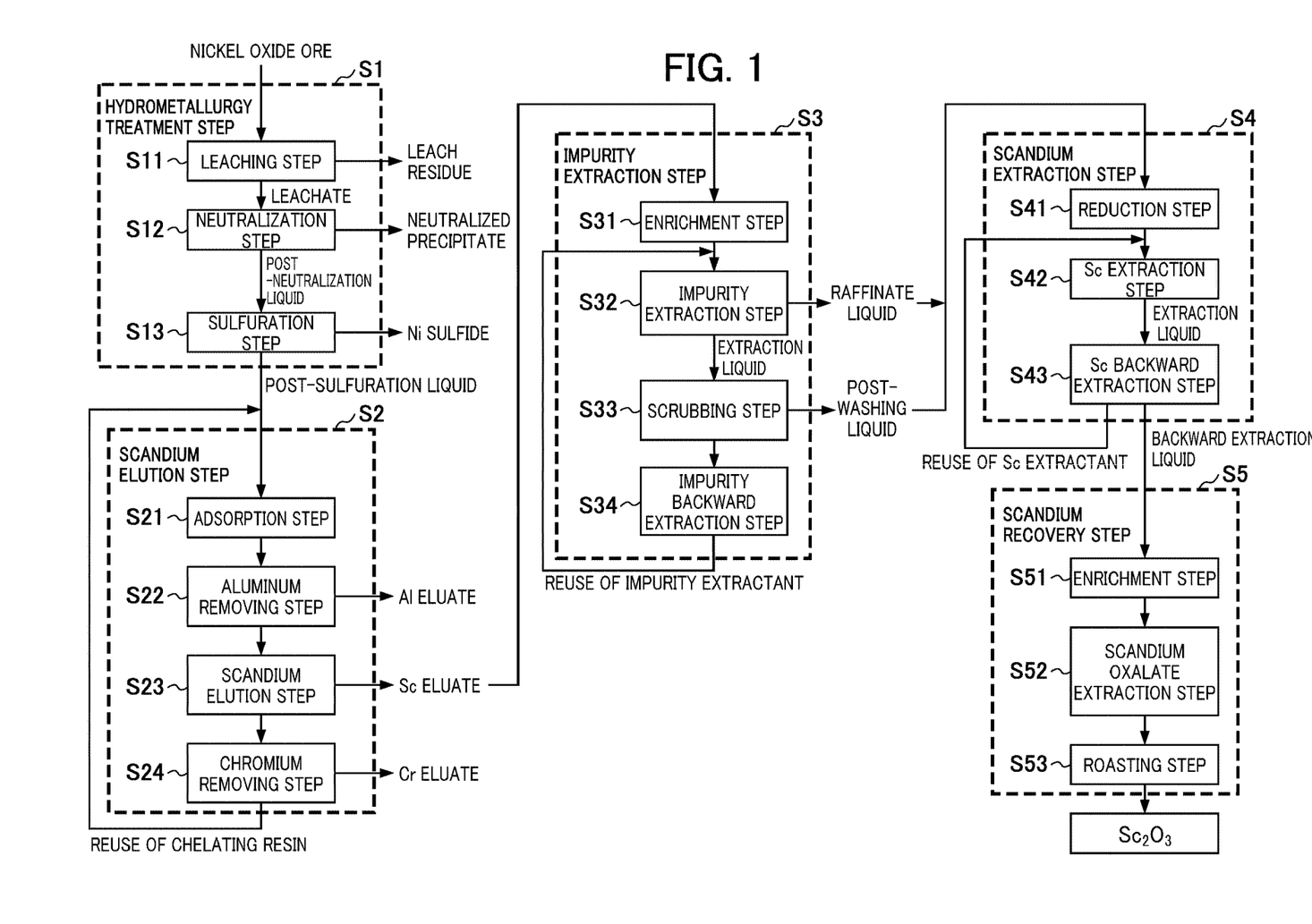
FIG. 1 is a flow diagram for illustrating the method for recovering scandium according to a first embodiment of the present invention.

FIG. 1 is a flow diagram for illustrating an example of the method for recovering scandium according to the first embodiment. This method for recovering scandium is for simply and efficiently recovering high purity scandium from an acidic solution, which contains scandium and impurities and is obtained by leaching nickel oxide ore using an acid such as sulfuric acid, by separating scandium and impurities in the acidic solution from each other.

In this method for recovering scandium, the impurities in an acidic solution containing scandium and impurities (solution to be treated) are extracted into an impurity extractant (first organic phase) and separated from scandium which will remain in the acidic solution (first aqueous phase) after the extraction by subjecting the acidic solution to a first solvent extraction treatment using an amine-based impurity extractant. Then, scandium is extracted into a scandium extractant (second organic phase) and separated from the impurities remaining in the acidic solution (second aqueous phase) by subjecting the acidic solution (first aqueous phase) to the second solvent extraction using a scandium extractant containing an amide derivative. Scandium extracted into the scandium extractant (second organic phase) is recovered by subjecting the scandium extractant to backward extraction to separate the scandium extractant into an acidic solution containing scandium (third aqueous phase) and a third organic phase and adding oxalic acid to the third aqueous phase to precipitate scandium as scandium oxalate.

In this way, the method for recovering scandium according to the first embodiment is characterized in that the first solvent extraction treatment using an amine-based impurity extractant is performed and then the second solvent extraction using a scandium extractant containing an amide derivative is performed when scandium is separated and recovered by solvent extraction. According to such a method, impurities can be more effectively separated, a stable operation can be performed even when a raw material such as nickel oxide ore which contains a large amount of impurities is used, and high purity scandium can be efficiently recovered.

For example, the method for recovering scandium according to the first embodiment includes: a hydrometallurgy treatment step S1 of nickel oxide ore of leaching nickel oxide ore with an acid such as sulfuric acid to obtain an acidic solution containing scandium and impurities; a scandium elution step S2 of removing impurities from the acidic solution to obtain a scandium eluate with scandium enriched; an impurity extraction step S3 of subjecting the scandium eluate to first solvent extraction using an amine-based impurity extractant to extract impurities into the impurity extractant (first organic phase) and separate the impurities from scandium to remain in an acidic solution (first aqueous phase) after the extraction; a scandium extraction step S4 of subjecting the acidic solution (first aqueous phase) to second solvent extraction using a scandium extractant containing an amide derivative to extract scandium into the scandium extractant (second organic phase) and separate the scandium from other impurities to remain in an acidic solution (second aqueous phase); and a scandium recovery step S5 of subjecting the scandium extractant (second organic phase) to backward extraction to recover scandium from the backward extraction liquid (third aqueous phase) containing scandium as illustrated in the flow diagram of FIG. 1.

<<2. Each Step of Method for Recovering Scandium>>

<2-1. Hydrometallurgy Treatment Step of Nickel Oxide Ore>

As the scandium-containing acidic solution to be a target for the process for recovering scandium, an acidic solution obtained by treating nickel oxide ore with sulfuric acid can be used.

Specifically, as the acidic solution to be subjected to solvent extraction, a post-sulfuration liquid can be used which is obtained through the hydrometallurgy treatment step S1 of nickel oxide ore, the hydrometallurgy treatment step S1 including: a leaching step S11 of leaching nickel oxide ore with an acid such as sulfuric acid at high temperature and high pressure to obtain a leachate; a neutralization step S12 of adding a neutralizing agent to the leachate to obtain a neutralized precipitate containing impurities and a post-neutralization liquid; and a sulfuration step S13 of adding a sulfurizing agent to the post-neutralization liquid to obtain nickel sulfide and a post-sulfuration liquid. Below, the process flow of the hydrometallurgy treatment step S1 of nickel oxide ore will be described.

[Leaching Step S11]

The leaching step S11 is a step of adding sulfuric acid to a slurry of nickel oxide ore, for example, in a high temperature pressurized vessel (an autoclave) and the like, and performing a stirring treatment at a temperature of 240° C. to 260° C. to form a leach slurry including a leachate and a leach residue. Note that a treatment in the leaching step S11 can be performed according to the conventionally known HPAL process, which is described, for example, in Patent Document 1.

Here, examples of nickel oxide ore mainly include so-called laterite ore such as limonite ore and saprolite ore. The content of nickel in laterite ore is usually 0.8 to 2.5 wt %, and contained as a hydroxide or a silica magnesia (magnesium silicate) mineral. Further, these nickel oxide ores contain scandium.

In this leaching step S11, solid-liquid separation is performed to obtain a leachate containing nickel, cobalt, scandium, and the like; and a leach residue as a hematite while washing the resulting leach slurry including the leachate and the leach residue. In the above solid-liquid separation treatment, for example, the leach slurry is mixed with a washing liquid, and then solid-liquid separation is performed in a solid-liquid separation apparatus such as a thickener using an aggregating agent supplied from an apparatus for supplying an aggregating agent and the like. Specifically, the leach slurry is first diluted with the washing liquid, and then the leach residue in the slurry is condensed as a precipitate in the thickener. Note that in the above solid-liquid separation treatment, solid-liquid separation is preferably performed while washing the leach slurry by a multi-stage washing process using multistaged solid-liquid separation cells such as thickners.

[Neutralization Step S12]

The neutralization step S12 is a step of adding a neutralizing agent to the leachate obtained in the leaching step S11 described above to adjust the pH, thereby obtaining a neutralized precipitate containing impurity elements and a post-neutralization liquid. By the neutralization treatment in this neutralization step S12, valuable metals such as nickel, cobalt, and scandium are contained in the post-neutralization liquid and most impurities including iron and aluminum are contained in the neutralized precipitate.

For the neutralizing agent, conventionally known substances may be used, including, for example, calcium carbonate, slaked lime, sodium hydroxide, and the like.

In the neutralization treatment of the neutralization step S12, the pH is preferably adjusted to the range of between 1 or more and 4 or less and preferably the range of between 1.5 or more and 2.5 or less while preventing oxidation of the leachate separated. When the pH is less than 1, neutralization may insufficiently proceed and the leachate may not be separated into the neutralized precipitate and the post-neutralization liquid. On the other hand, when the pH is more than 4, not only impurities including aluminum but also valuable metals such as scandium and nickel may be contained in the neutralized precipitate.

[Sulfuration Step S13]

The sulfuration step S13 includes adding a sulfurizing agent to the post-neutralization liquid obtained from the aforementioned neutralization step S12 to obtain nickel sulfide and a post-sulfuration liquid. Nickel, cobalt, zinc, and the like are transformed into sulfides, and scandium and the like is contained in the post-sulfuration liquid after the sulfuration treatment in the above sulfuration step S13.

Specifically, in this sulfuration step S13, a sulfurizing agent such as gaseous hydrogen sulfide, sodium sulfide, or hydrogenated sodium sulfide is blown into the resulting post-neutralization liquid to generate sulfides (a mixture of nickel and cobalt sulfides) including nickel and cobalt with less impurity components and a post-sulfuration liquid which has a low level of nickel concentration and stabilized, and contains scandium and the like.

In the sulfuration treatment of the sulfuration step S13, sedimentation and separation treatment of a slurry of the mixture of nickel and cobalt sulfides is performed using a sedimentation apparatus such as a thickener to separate and recover the mixture of nickel and cobalt sulfides from the bottom of the thickener. Meanwhile, the post-sulfuration liquid as an aqueous solution component is overflown for recovery.

In the method for recovering scandium according to the first embodiment, the post-sulfuration liquid obtained through each step of the hydrometallurgy treatment step S1 of nickel oxide ore can be used as an acidic solution containing scandium to be a target for the process for recovering scandium.

<2-2. Scandium (Sc) Elution Step>

As described above, the post-sulfuration liquid as a scandium-containing acidic solution obtained by leaching nickel oxide ore with sulfuric acid can be applied as a target solution for the process for recovering scandium. However, for example, the post-sulfuration liquid as a scandium-containing acidic solution contains, in addition to scandium, aluminum, chromium, and various other impurities which have remained in the solution without being sulfurized by the sulfuration treatment in the sulfuration step S13 described above. In view of the above, a scandium eluate (scandium-containing solution) is preferably generated by previously removing impurities contained in the acidic solution to enrich scandium (Sc) in the scandium elution step S2 before this acidic solution is subjected to solvent extraction.

In the scandium elution step S2, impurities such as aluminum contained in the acidic solution can be separated and removed by, for example, a method of ion exchange treatment to obtain a scandium-containing solution with scandium enriched.

Note that the overview of a method of removing impurities contained in the acidic solution and enriching and eluting scandium will be described below by taking a method of performing an ion exchange reaction using a chelating resin as an example thereof while referring to the flow diagram illustrated in FIG. 1 but the method is not limited to this method.

There is no particular limitation for the aspect of the ion exchange reaction, but examples thereof include one including: an adsorption step S21 of bringing the post-sulfuration liquid into contact with a chelating resin to adsorb scandium to the chelating resin; an aluminum removing step S22 of bringing 0.1 N or less of sulfuric acid into contact with the chelating resin to which scandium has been adsorbed to remove aluminum adsorbed to the chelating resin; and a scandium elution step S23 of bringing 0.3 N or more and 3 N or less of sulfuric acid into contact with the chelating resin to obtain a scandium eluate. Further, it is preferable to include a chromium removing step S24 of bringing 3 N or more of sulfuric acid into contact with the chelating resin which has been subjected to the scandium elution step S23 to remove chromium adsorbed to the chelating resin in the adsorption step S21 so that the chelating resin can be reused although it is not essential. Below, the overview of each step will be briefly described.

[Adsorption Step S21]

In the adsorption step S21, the post-sulfuration liquid is brought into contact with a chelating resin to allow scandium to be adsorbed by the chelating resin. There is no particular limitation for the type of the chelating resin, and for example, a resin having iminodiacetic acid as a functional group can be used.

[Aluminum Removing Step S22]

It is preferable to perform the aluminum removing step S22 of bringing 0.1 N or less of sulfuric acid into contact with the chelating resin to which scandium has been adsorbed in the adsorption step S21 to remove aluminum adsorbed to the chelating resin prior to elution of scandium from the chelating resin to which scandium has been adsorbed in the adsorption step S21 although it is not essential. By performing the aluminum removing step S22, aluminum can be removed from the chelating resin while adsorbing scandium to the chelating resin.

When removing aluminum, the pH is maintained preferably in the range of between 1 or more and 2.5 or less and more preferably in the range of between 1.5 or more and 2.0 or less.

[Scandium Elution Step S23]

In the scandium elution step S23, 0.3 N or more and 3 N or less of sulfuric acid is brought into contact with the chelating resin to which scandium has been adsorbed to obtain a scandium eluate. When obtaining the scandium eluate, the normality of sulfuric acid used as an eluate is maintained preferably in the range of between 0.3 N or more and 3 N or less and more preferably in the range of between 0.5 N or more and 2 N or less.

[Chromium Removing Step S24]

It is preferable to perform the chromium removing step S24 of bringing 3 N or more of sulfuric acid into contact with the chelating resin which has been subjected to the scandium elution step S23 to remove chromium adsorbed to the chelating resin in the adsorption step S21 so that the chelating resin can be reused although it is not essential. In the chromium removing step S24, 3 N or more of sulfuric acid is brought into contact with the chelating resin which has been subjected to the scandium elution step S23 to remove chromium adsorbed to the chelating resin in the adsorption step S21. When the normality of sulfuric acid used as an eluate is less than 3 N at the time of chromium removal, chromium may not be properly removed from the chelating resin and a trouble may be caused when reusing the chelating resin.

<2-3. Impurity Extraction Step>

Next, in the impurity extraction step S3, the scandium-containing solution obtained in the scandium elution step S2, namely, the acidic solution containing scandium and impurities is subjected to the first solvent extraction using an amine-based impurity extractant to separate the solution into an extraction liquid containing impurities (first organic phase) and a raffinate liquid containing scandium (first aqueous phase).

There is no particular limitation for the aspect of the impurity extraction step S3. For example, it is preferable to include: an impurity extraction step S32 of mixing a scandium-containing solution and an organic solvent containing an amine-based impurity extractant and separating the mixture into an post-extraction organic phase (first organic phase) containing impurities and a trace amount of scandium and a raffinate liquid (first aqueous phase) in which scandium remains; a scrubbing step S33 of mixing a sulfuric acid solution with the post-extraction organic phase to separate a trace amount of scandium extracted into the post-extraction organic phase into an aqueous phase and to obtain a post-washing liquid (organic phase); and an impurity backward extraction step S34 of adding a backward extractant to the post-washing liquid to backward extract impurities from the post-washing liquid.

[Enrichment Step S31]

The enrichment of scandium may be performed by performing neutralization with sodium hydroxide and dissolution with sulfuric acid when the scandium concentration in the eluate is remarkably low although it is not essential. Through the enrichment step S31, the scandium-containing solution can be decreased in volume, and as a result, the amount of the organic solvent containing an amine-based impurity extractant to be used can be decreased.

[Impurity Extraction Step S32]

In the impurity extraction step S32, the scandium-containing solution and the organic solvent containing an amine-based impurity extractant are mixed together to selectively extract impurities into the organic solvent and to obtain an organic solvent (first organic phase) containing impurities and a raffinate liquid (first aqueous phase). The method for recovering scandium according to the first embodiment is characterized in that a solvent extraction treatment using an amine-based impurity extractant is performed in this impurity extraction step S31. By performing the solvent extraction treatment using an amine-based impurity extractant, impurities can be more efficiently and effectively extracted and separated from scandium.

Here, the amine-based impurity extractant has a low selectivity for scandium, and does not require a neutralizing agent during extraction, and may have other characteristics. For example, the following can be used as the amine-based impurity extractant: those known under the trade names of, for example, a primary amine Primene JM-T, a secondary amine LA-1, a tertiary amine TNOA (Tri-n-octylamine), TIOA (Tri-i-octylamine), and the like.

When performing the extraction, the amine-based impurity extractant is preferably used after being diluted with, for example, a hydrocarbon-based organic solvent and the like. There is no particular limitation for the concentration of the amine-based impurity extractant in an organic solvent, but it is preferably about 1 vol % or more and about 10 vol % or less, in particular more preferably about 5 vol % with respect to 1 volume of the organic solvent, in view of phase separability during the extraction and the backward extraction described below.

Moreover, there is no particular limitation for the volume ratio of the organic solvent and the scandium-containing solution when performing extraction, but the molar amount of the organic solvent is preferably 0.01 times or more and 0.1 times or less relative to the molar amount of metal in the scandium-containing solution.

Through the impurity extraction step S32, most impurity elements contained in nickel oxide ore, specifically, thorium of an actinoid element other than nickel, magnesium, chromium, manganese, calcium, cobalt, and the like can be separated as impurities. In particular, thorium which cannot be separated only by the scandium extraction step S4 can be separated as an impurity through the impurity extraction step S3.

[Scrubbing (Washing) Step S33]

When a trace amount of scandium is co-existent in a solvent (first organic phase) into which impurities are extracted from the scandium-containing solution in the impurity extraction step S32 described above, the first organic phase is preferably subjected to a scrubbing (washing) treatment to separate scandium into an aqueous phase and to recover scandium from the extractant (scrubbing step S33) in order to increase the recovery rate of scandium although it is not essential.

The recovery rate of scandium can be further increased by washing the organic solvent through the scrubbing step S33 and separating a trace amount of scandium extracted with an amine-based impurity extractant into an aqueous phase in this way.

For a solution (a washing solution) used for scrubbing, a sulfuric acid solution, a hydrochloric acid solution, and the like can be used. Further, solutions to which water-soluble chlorides and sulfates are added can also be used. Specifically, when a sulfuric acid solution is used as a washing solution, a solution having a concentration in the range of between 1.0 mol/L or more and 3.0 mol/L or less is preferably used.

The number of washing stages (the number of times) also depends on the kinds and concentrations of impurity elements, and thus can be appropriately changed depending on each amine-based extractant, extraction conditions, and the like. For example, when the phase ratio of the organic phase (O) to the aqueous phase (A), O/A is 1, the number of washing stages of about 3 to 5 can allow scandium extracted into the organic solvent to be separated to less than the lower detection limit of an analyzer.

[Impurity Backward Extraction Step S34]

It is preferable to backward extract impurities from this organic solvent so that the organic solvent (first organic phase) into which the impurities are extracted from the scandium-containing solution can be reused as the extractant in the impurity extraction step S32 although it is not essential. Specifically, in the impurity backward extraction step S34, the backward extraction solution (the backward extraction starting liquid) is added to and mixed with an organic solvent containing an amine-based impurity extractant to effect a reaction opposite to that in the extraction treatment of the impurity extraction step S32. This enables backward extraction of impurities to give a post-backward extraction liquid (aqueous phase) containing impurities.

As described above, impurities are selectively extracted using an amine-based impurity extractant in the extraction treatment of the impurity extraction step S32. Therefore, a solution containing a carbonate salt such as sodium carbonate or potassium carbonate is preferably used as the backward extraction solution in view of effective separation of these impurities from the organic solvent containing an amine-based impurity extractant and regeneration of the amine-based impurity extractant.

For example, the concentration of a carbonate-containing solution serving as the backward extraction solution is preferably about 0.5 mol/L or more and 2 mol/L or less in view of avoidance of excessive use.

Note that when the organic solvent containing an amine-based impurity extractant is subjected to the scrubbing treatment in the scrubbing step S33 described above, a backward extraction solution can similarly be added to and mixed with the amine-based impurity extractant after scrubbing to perform the backward extraction treatment.

An extractant, from which impurities have been separated by adding a solution of a carbonate salt such as sodium carbonate to the extractant after extraction or the extractant after scrubbing and performing the backward extraction treatment in this way, can be repeatedly used again as an extractant in the impurity extraction step S32.

<2-4. Scandium Extraction Step>

Next, in the scandium extraction step S4, the impurities in the raffinate liquid remain in the post-extraction liquid (second aqueous phase), scandium is partitioned into the extractant (second organic phase), and thus scandium and impurities are separated from each other by subjecting the scandium-containing raffinate liquid (first aqueous phase) obtained in the impurity extraction step S3 to the second solvent extraction using a scandium extractant containing an amide derivative, and an extraction liquid containing scandium (second organic phase) is further brought into contact with sulfuric acid to obtain a backward extraction liquid (aqueous phase) containing scandium.

There is no particular limitation for the aspect of the solvent extraction step S4, but it is preferable to include a reduction step S41 of reducing trivalent iron contained as an impurity in the scandium-containing raffinate liquid (first aqueous phase) obtained in the impurity extraction step S3 to divalent iron; a scandium extraction step S42 of mixing the scandium-containing solution and an extractant which is an organic solvent and separating the mixture into an extracted organic solvent (second organic phase) into which a trace amount of impurities and scandium are extracted and a raffinate liquid (second aqueous phase) in which impurities remain; and a backward extraction step S43 of mixing a sulfuric acid solution with the post-extraction organic solvent to separate scandium which has been extracted into the post-extraction organic solvent into an aqueous phase and to obtain a backward extraction liquid.

[Reduction Step S41]

It is preferable to perform the reduction step S41 of reducing trivalent iron contained as an impurity in the scandium-containing raffinate liquid (first aqueous phase) obtained in the impurity extraction step S3 to divalent iron before mixing the scandium-containing solution with the organic solvent containing an extractant although it is not essential. By performing this reduction step S41, the selection rate of iron of an impurity to the raffinate liquid (second aqueous phase) is increased in the later scandium extraction step S42, and as a result, the grade (purity) of scandium to be recovered can be increased.

There is no particular limitation for the aspect of the reduction step S41. Examples thereof include an aspect in which gaseous hydrogen sulfide is blown into the scandium-containing raffinate liquid (first aqueous phase) obtained in the impurity extraction step S3.

[Scandium Extraction Step S42]

In the scandium extraction step S42, scandium is selectively extracted into an organic solvent containing an extractant by mixing a scandium-containing solution with the organic solvent, and an organic solvent containing scandium (second organic phase) and a raffinate liquid containing impurities (second aqueous phase) are obtained. The method for recovering scandium according to the first embodiment is characterized in that solvent extraction using a scandium extractant containing an amide derivative is performed in this scandium extraction step S42. By performing a solvent extraction treatment using a scandium extractant containing an amide derivative, aluminum and iron still remaining in the scandium-containing solution even through the impurity extraction step S3 can be separated as impurities.

(Amide Derivative)

The amide derivative constituting the scandium extractant is characterized by high selectivity with scandium. Examples of such an amide derivative include those represented by the following general formula (I). By introducing an alkyl group into the backbone of an amide, the lipophilicity can be enhanced and the amide derivative can be used as an extractant.

[Formula 2]

(I)

In the formula, the substituents $R^1$ and $R^2$ each represent the same alkyl group or different alkyl groups. The alkyl group may be linear or branched, but the alkyl group is preferably branched since the solubility in an organic solvent is enhanced. By introducing an alkyl group into the backbone of an amide, the lipophilicity can be enhanced and the amide derivative can be used as an extractant.

Further, in $R^1$ and $R^2$, there is no particular limitation for the number of carbon atoms of the alkyl group, but it is preferably 5 or more and 11 or less. When the number of carbon atoms is 4 or less, the water solubility of the amide derivative is enhanced and the amide derivative may be contained in the aqueous phase. When the number of carbon atoms is 12 or more, the surface active performance is enhanced and an emulsion is likely to be formed. Further, when the number of carbon atoms is 12 or more, a third amide derivative layer can be formed separately from an aqueous phase containing an acidic solution and an organic phase containing an organic solvent.

$R^3$ represents a hydrogen atom or an alkyl group. $R^4$ represents a hydrogen atom or an arbitrary group other than an amino group, which is bonded to an α carbon as an amino acid.

There is no particular limitation for the amide derivative as long as it can selectively extract scandium, but in view of simple production, it is preferably a glycinamide derivative. When the amide derivative is a glycinamide derivative, the glycinamide derivative can be synthesized by the following method.

First, a 2-halogenated acetyl halide is added to an alkylamine having a structure represented by $NHR^1R^2$ ($R^1$ and $R^2$ are the same as the substituents $R^1$ and $R^2$) and the hydrogen atom of the amine is substituted with 2-halogenated acetyl by a nucleophilic substitution reaction, thereby obtaining 2-halogenated (N,N-di)alkyl acetamide.

Next, the 2-halogenated (N,N-di)alkyl acetamide is added to glycine or a N-alkylglycine derivative and one of the hydrogen atoms in the glycine or N-alkylglycine derivative is substituted with an (N,N-di)alkyl acetamide group by a nucleophilic substitution reaction. A glycine alkylamide derivative can be synthesized by these two stages of reactions.

In addition, a histidine amide derivative, a lysine amide derivative, or an aspartic acid amide derivative can be synthesized by replacing glycine with histidine, lysine, or aspartic acid. It is considered that the extraction behavior by a glycine alkylamide derivative, a histidine amide derivative, a lysine amide derivative, and an aspartic acid amide derivative falls within the range of the results when using a glycine derivative from the complex stability constants of manganese, cobalt, and the like to be a target.

When the compound represented by the general formula (I) is a histidine amide derivative, the histidine amide derivative is represented by the following general formula (II).

[Formula 3]

(II)

When the compound represented by the general formula (I) is a lysine amide derivative, the lysine amide derivative is represented by the following general formula (III).

[Formula 4]

(III)

When the compound represented by the general formula (I) is an aspartic acid amide derivative, the aspartic acid amide derivative is represented by the following general formula (IV).

[Formula 5]

(IV)

In the formulas (II) to (IV), substituents $R^1$ and $R^2$ are the same as those described in the formula (I).

Note that the amide derivative may be a n-methylglycine derivative.

(Extraction of Scandium)

In order to extract scandium ions using the amide derivative, an acidic aqueous solution containing scandium ions of interest is added to and mixed with an organic solution containing the amide derivative while adjusting this acidic aqueous solution. This makes it possible to selectively extract scandium ions of interest into the second organic phase.

When performing extraction, a scandium extractant containing an amide derivative is preferably used after being diluted with, for example, a hydrocarbon-based organic solvent and the like. The organic solvent may be any solvent as long as it dissolves the amide derivative and the metal extraction species, and examples thereof include chlorine-based solvents such as chloroform and dichloromethane, aromatic hydrocarbons such as benzene, toluene, and xylene, and aliphatic hydrocarbons such as hexane. These organic solvents may be used singly or in mixture of a plurality thereof, and an alcohol such as 1-octanol may be mixed.

The concentration of the amide derivative can be appropriately set depending on the concentration of scandium, but it is preferably about 10 vol % or more and about 30 vol % or less, in particular more preferably about 20 vol % with respect to 100 vol % of the organic solvent, in view of phase separability and the like during the extraction and the backward extraction described below.

In order to efficiently recover scandium from an acidic aqueous solution containing scandium and impurities (mainly divalent iron and aluminum), it is preferable to add an organic solution of an extractant while adjusting the pH of the acidic aqueous solution containing scandium to 2.5 or less, and it is more preferable to add the organic solution of an extractant while adjusting the pH to 1.5 or less. When the pH is too high, not only scandium but also impurities may be extracted into the second organic phase.

There is no particular limitation for the lower limit of the pH, but it is more preferable to add an organic solution of an extractant while adjusting the pH to 1 or more. When the pH is too low, scandium cannot be sufficiently extracted but may remain in the second aqueous phase.

The stirring time and the extraction temperature may be appropriately set depending on the conditions of the acidic aqueous solution of scandium ions and the organic solution of an extractant.

[Scandium Backward Extraction Step S43]

In the scandium backward extraction step S43, scandium is backward-extracted from the organic solvent into which scandium is extracted in the scandium extraction step S42. Specifically, in the scandium backward extraction step S43, a backward extraction solution (backward extraction starting liquid) is added to and mixed with an organic solvent containing an amide derivative to effect a reaction opposite to that in the extraction treatment of the scandium extraction step S42. This enables backward extraction of scandium to give a post-backward extraction liquid containing scandium (third aqueous phase).

As a solution to be used in the backward extraction, a sulfuric acid solution, water, or the like can be used. It is also possible to use a solution to which a water-soluble sulfate salt is added. Specifically, when a sulfuric acid solution is used as a backward extraction solution, it is preferable to use a solution having a concentration range of between 1.0 mol/L or more and 2.0 mol/L or less.

The number of backward extraction stages (number of times) also depends on the kinds and concentrations of impurity elements, and it can be thus appropriately changed depending on the scandium extractant including an amide derivative, extraction conditions, and the like to be used. For example, when the phase ratio of the organic phase (O) to the aqueous phase (A), O/A is 1, the number of backward extraction stages of about 3 to 5 can allow scandium extracted into the organic solvent to be recovered to less than the lower detection limit of an analyzer.

The extractant (organic phase) obtained after a sulfuric acid solution is added to the extractant after extraction, the backward extraction treatment is performed, and thus scandium is recovered in this way can be repeatedly used again as an extractant in the scandium extraction step S42.

<2-5. Scandium Recovery Step>

Next, in the scandium recovery step S5, scandium is recovered from the backward extraction liquid obtained in the scandium extraction step S4.

There is no particular limitation for the method for recovering scandium in the scandium recovery step S4, and any known method can be used. Examples of a known method include a method in which an alkali is added to the post-backward extraction liquid (third aqueous phase) to neutralize the liquid and scandium is recovered as a precipitate of scandium hydroxide and a method in which oxalic acid is added to the post-backward extraction liquid (third aqueous phase) and scandium is recovered as a precipitate of scandium oxalate. Among these, it is preferable to add oxalic acid to the post-backward extraction liquid (aqueous phase) since impurities can be even more effectively separated.

In the method of adding oxalic acid to the post-backward extraction liquid (third aqueous phase), scandium contained in the post-backward extraction liquid (third aqueous phase) is first enriched if necessary. Subsequently, oxalic acid is added to the third aqueous phase to generate a precipitate of scandium oxalate, and then scandium oxalate is dried and roasted to recover scandium as scandium oxide. Below, the scandium recovery step S5 will be described in detail with referring to the flow diagram illustrated in FIG. 2.

[Enrichment Step S51]

When the scandium concentration in the backward extraction liquid obtained in the scandium extraction step S4 is low, it is preferable to neutralize the post-backward extraction liquid (third aqueous phase) with sodium hydroxide, to dissolve scandium using sulfuric acid, and thus to enrich scandium.

In addition to sodium hydroxide, calcium carbonate, slaked lime, and the like are also known as neutralizing agents. However, the post-backward extraction liquid (third aqueous phase) is a sulfuric acid solution, and it is not preferable that the neutralizing agent contains Ca since gypsum is generated by addition of the neutralizing agent.

The pH when a neutralizing agent is added is preferably 6.0 or more. When the pH is too low, the neutralization is insufficient and Sc may not be sufficiently recovered.

There is no particular limitation for the upper limit of the pH when a neutralizing agent is added, but the pH when a neutralizing agent is added is preferably 7.0 or less in view of a decrease in the amount of the neutralizing agent to be used.

[Scandium Oxalate Precipitation Step S52]

The scandium oxalate precipitation step S52 is a step of adding a predetermined amount of oxalic acid to the post-backward extraction liquid (third aqueous phase) or the enriched liquid after the enrichment step S51 to precipitate scandium as a solid of scandium oxalate and separating the solid of scandium oxalate from the liquid phase.

The pH when oxalic acid is added is preferably 0 or more and 1.0 or less, more preferably 0.5 or more and 1.0 or less, and still more preferably 0.7 or more and 1.0 or less. When the pH is too low, the solubility of scandium oxalate increases and the scandium recovery rate may decrease. When the pH is too high, not only scandium oxalate but also oxalate salts of impurities contained in the post-backward extraction liquid (third aqueous phase) or the enriched liquid after the enrichment step S51 also precipitate and the scandium purity of the precipitate may decrease.

When the scandium eluate obtained through the hydrometallurgy treatment step S1 and the scandium elution step S2 is directly subjected to the scandium recovery step S5 without being subjected to the impurity extraction step S3 and the scandium extraction step S4, oxalate salts of impurities contained in the scandium eluate also precipitate and the scandium purity of the precipitate may decrease unless the pH when oxalic acid is added is set to near 0. Therefore, in order to obtain high grade scandium, the pH is required to be set to near 0 even if the yield decreases.

In the invention described in the present embodiment, high grade scandium can be recovered even when the pH when oxalic acid is added is set to near 1 since the original liquid to be subjected to the scandium oxalate precipitation step S52 is purified. Consequently, the invention described in the present embodiment exhibits a remarkable effect that both grade and yield can achieve.

There is no particular limitation for the amount of oxalic acid to be added, but it is set to an amount to be preferably 1.05 times or more and 3.0 times or less, more preferably 1.5 times or more and 2.5 times or less, and still more preferably 1.7 times or more and 2.3 times or less the equivalent amount required to precipitate scandium contained in the raffinate liquid and the like as an oxalate salt. When the amount of oxalic acid to be added is too small, there is a possibility that the entire amount of scandium may not be recovered. On the other hand, when the amount of oxalic acid to be added is too large, the solubility of resulting scandium oxalate increases and scandium redissolves and the recovery rate decreases or the amount of oxidizing agent such as sodium hypochlorite to be used in order to decompose excessive oxalic acid increases.

[Roasting Step S53]

The roasting step S53 is a step of washing the precipitate of scandium oxalate obtained in the scandium oxalate precipitation step S53 with water, drying the precipitate, and then roasting the precipitate. Scandium can be recovered as extremely high purity scandium oxide through the roasting treatment in this roasting step S53.

There is no particular limitation for the roasting conditions, but for example, heating in a tubular furnace at about 900° C. for about 2 hours may be used. Note that a continuous furnace such as a rotary kiln is preferably used for industrial production because both drying and roasting can be performed with the same equipment.

Second Embodiment

Figure 2:
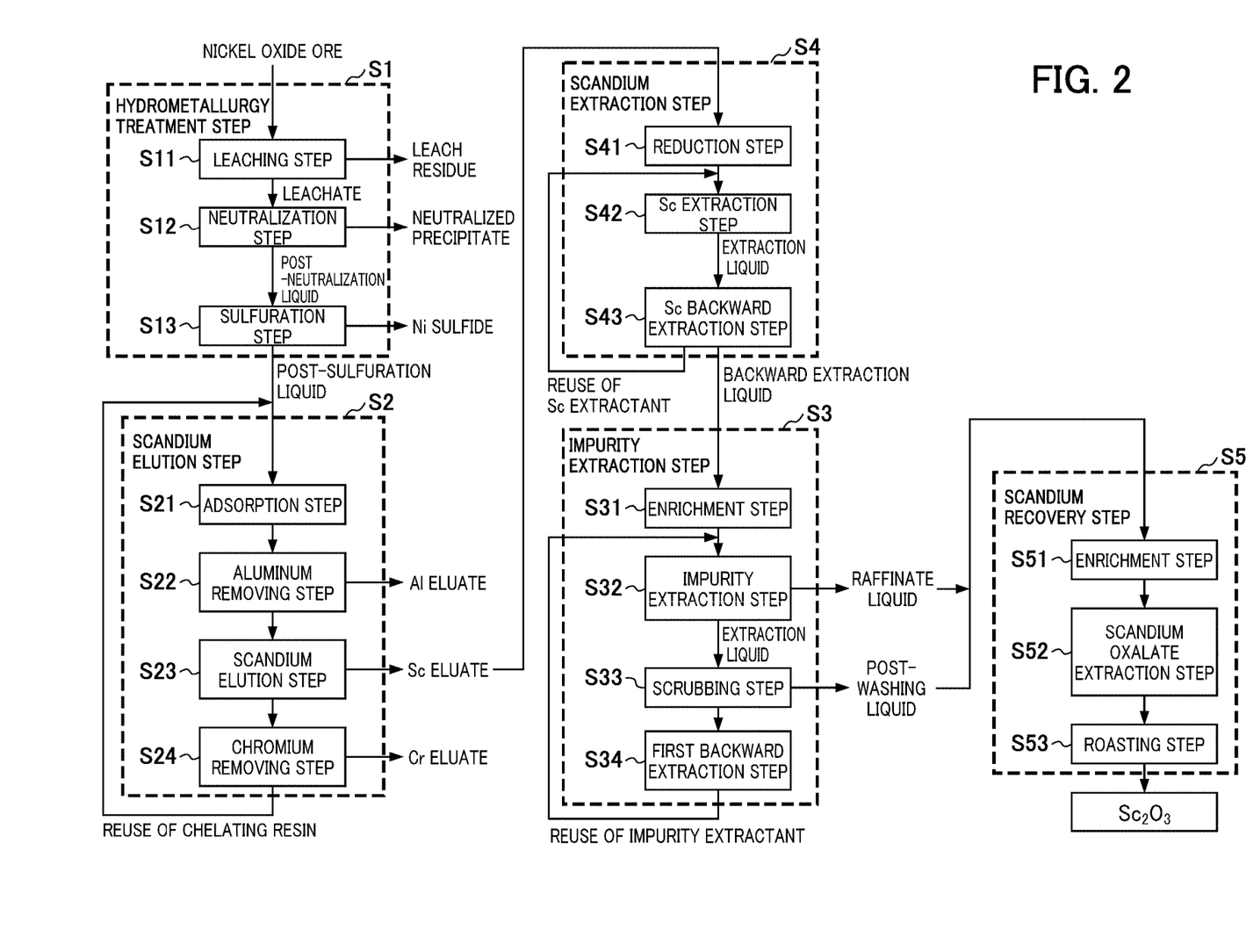
FIG. 2 is a flow diagram for illustrating the method for recovering scandium according to a second embodiment of the present invention.

FIG. 2 is a flow diagram for illustrating an example of the method for recovering scandium according to the second embodiment.

In the first embodiment, after the hydrometallurgy treatment step S1 and the scandium elution step S2, solvent extraction using an amine-based impurity extractant (impurity extraction step S3) is first performed, subsequently solvent extraction using a scandium extractant containing an amide derivative (scandium extraction step S4) is performed, and the scandium recovery step S5 is performed.

However, the order of solvent extraction is not limited to the aspect of the first embodiment. The order of solvent extraction in the second embodiment is the reverse of that in the first embodiment. That is, in the second embodiment, after the hydrometallurgy treatment step S1 and the scandium elution step S2, solvent extraction using a scandium extractant containing an amide derivative (scandium extraction step S4) is first performed, subsequently solvent extraction using an amine-based impurity extractant (impurity extraction step S3) is performed, and the scandium recovery step S5 is performed.

Note that the second embodiment is different from the first embodiment only in the order of solvent extraction, and the contents of each step are the same as those in the first embodiment.

EXAMPLES

Below, the present invention will be described in more detail with reference to Examples. However, the present invention shall not in any sense be limited to these Examples.

<Test Example 1> Construction of Scandium Recovery Process

Example 1

[Hydrometallurgy Treatment Step S1]
(Leaching Step S11)

First, high pressure acid leach of nickel oxide ore using sulfuric acid was performed according to a known method such as the method described in Patent Document 1.
(Neutralization Step S12)

Subsequently, the pH of the resulting leachate was adjusted to remove impurities.
(Sulfuration Step S13)

Then, a sulfurizing agent was added to the leachate from which the impurities had been removed and nickel sulfide of a solid was removed, thereby preparing a post-sulfuration liquid. This post-sulfuration liquid is defined as a scandium-containing solution (pre-extraction original liquid). Note that the composition of the post-sulfuration liquid is shown in Table 1.

TABLE 1

| Composition of post-sulfuration liquid | Sc | Al | Fe(II) Fe(III) |
|---|---|---|---|
| [mg/L] | 19 | 2,500 | 2,500 |

Note that the grade (purity) of scandium was only about 0.1 wt % when an aqueous solution of sodium hydroxide was added to the post-sulfuration liquid obtained through the hydrometallurgy treatment step S1 until the pH reached 6.8 to generate a hydroxide precipitate and the grade of scandium contained in the hydroxide precipitate was measured.
[Scandium Elution Step S2]
(Adsorption Step S21)

Next, the resulting post-sulfuration liquid was brought into contact with a chelating resin to adsorb scandium to the chelating resin. In the present Examples, a resin having iminodiacetic acid as a functional group was used as a chelating resin.
(Aluminum Removing Step S22)

Next, 0.05 N sulfuric acid was brought into contact with the chelating resin to which scandium had been adsorbed to remove aluminum adsorbed to the chelating resin.
(Scandium Elution Step S23)

Next, 0.5 N sulfuric acid was brought into contact with the chelating resin to which scandium had been adsorbed to obtain a scandium eluate.

Note that the grade (purity) of scandium was about 50 wt % when an aqueous solution of sodium hydroxide was added to the scandium eluate obtained through the hydrometallurgy treatment step S1 and the scandium elution step S2 until the pH reached 6.8 to generate a hydroxide precipitate and the grade (purity) of scandium contained in the hydroxide precipitate was measured. This grade is not proper when high purity scandium is required to be provided.
[Impurity Extraction Step S3]
(Enrichment Step S31)

Subsequently, the scandium eluate was subjected to an enrichment treatment by a known method such as heating to obtain a pre-extraction original liquid. Note that the composition of the pre-extraction original liquid is shown in Table 2.

TABLE 2

| Composition of pre-extraction original liquid | Sc | Al | Fe(II) Fe(III) | Others |
|---|---|---|---|---|
| [mg/L] | 10,000 | 3,500 | 4,600 | 470 |

The term "Others" in the component list of Table 2 and the tables hereafter collectively refers to various elements such as elements contained in nickel oxide ore such as nickel, magnesium, chromium, manganese, calcium, and cobalt and elements derived from the neutralizing agent or the like added when treating nickel oxide ore. "Others" is expressed as the total analytical values of these components that were able to be detected. Note that aluminum and iron (divalent and trivalent) are not included in "Others" in the present Examples.

(Impurity Extraction Step S32)

Next, 50 liters of an organic solvent in which an amine-based impurity extractant (Primene JM-T manufactured by The Dow Chemical Company) was adjusted to 5 vol % using a solvent (Shellsol A150 manufactured by Shell Chemicals Japan, Ltd.) was mixed with 100 liters of a solution having the composition shown in Table 2 as an extraction starting liquid, and the mixture was stirred at room temperature for 60 minutes to perform the first solvent extraction treatment, thereby obtaining a raffinate liquid (first aqueous phase) containing scandium.

The composition of each element contained in the resulting organic phase extract by this extraction was analyzed. The percentage of a value obtained by dividing the amount of each element contained in the organic phase extract (first organic phase) by the amount of that element contained in the pre-extraction original liquid was calculated, and this is shown in Table 3 below as an extraction rate (%).

TABLE 3

| Extraction rates of various elements | Sc | Al | Fe(II) Fe(III) | Others |
|---|---|---|---|---|
| [%] | 4 | — | — | 23 |

("-" in Table 3 indicates that it is not analyzed or value is less than lower measurement limit.)

As seen from the results of extraction rates in Table 3, the majority of scandium (Sc) contained in the pre-extraction original liquid was partitioned into the raffinate liquid (first aqueous phase) through the impurity extraction step. Although Al, Fe (divalent and trivalent), and the like were not extracted into the organic phase extract (first organic phase), the majority of other impurities were able to be separated into the organic phase extract (first organic phase).

(Scrubbing (Washing) Step S33)

Subsequently, 50 liters of a 1 mol/L sulfuric acid solution was mixed with 50 liters of the organic solvent (organic phase extract) which contained scandium and was obtained in the impurity extraction step S32 so that the phase ratio (O/A) became 1, and the mixture was stirred for 60 minutes to wash the organic phase. Then, it was allowed to stand for separation of the aqueous phase. The organic phase was again mixed with 50 liters of a fresh 1 mol/L sulfuric acid solution, and washed. The aqueous phase was then separated in a similar manner. The washing operation as described above was repeated 5 times in total.

In order to evaluate the extent of washing in the scrubbing (washing) step S33, a 1 mol/L aqueous solution of sodium carbonate was mixed with the organic phase extract after washing so that the phase ratio O/A became 1/1, and the mixture was stirred for 60 minutes to perform a backward extraction treatment, whereby the components (impurities and a trace amount of scandium remaining in the organic phase extract) contained in the organic phase extract after washing were backward-extracted into an aqueous phase.

The compositions of various elements contained in the post-backward extraction liquid obtained by this backward extraction treatment were analyzed. The percentage of a value obtained by dividing the amount of each element contained in the post-backward extraction liquid by the amount of that element extracted into the organic phase in the impurity extraction step S32 was calculated, and this is shown at the upper part of Table 4 as a recovery rate (%). The percentage of a value obtained by dividing the amount of each element contained in the post-backward extraction liquid by the amount of that element contained in the pre-extraction original liquid before performing the impurity extraction step S32 was calculated, and this is shown at the lower part of Table 4 as a recovery rate (%).

TABLE 4

| Recovery rates of various elements | Sc | Al | Fe(II) Fe(III) | Others |
|---|---|---|---|---|
| [%] | 25 (1) | — | — | ≈100 (≈23) |

("-" in Table 4 indicates that it is not analyzed or value is less than lower measurement limit.)

As seen from the results of recovery rates in Table 4, about 75% of scandium contained in the organic phase extract in the impurity extraction step S32 was able to be separated into the aqueous phase and recovered by performing the scrubbing (washing) step S33. Further, the elution of impurities contained in the organic phase extract was able to be suppressed to less than the lower measurement limit. As a result, by the scrubbing (washing) step S33, it was possible to effectively separate scandium extracted into the organic solvent in the impurity extraction step S32 into the aqueous phase and to prevent impurities from mixing into the aqueous phase.

Note that the grade (purity) of scandium was about 50 wt % when an aqueous solution of sodium hydroxide was added to the raffinate liquid (first aqueous phase) obtained through the hydrometallurgy treatment step S1, the scandium elution step S2, and the impurity extraction step S3 until the pH reached 6.8 to generate a hydroxide precipitate and the grade (purity) of scandium contained in the hydroxide precipitate was measured. This grade is not proper when high purity scandium is required to be provided.

It is considered that the reason is because not only scandium but also aluminum and iron (divalent and trivalent) are still contained in the raffinate liquid (first aqueous phase).

Note that thorium which cannot be separated in the scandium extraction step S4 may be contained as an impurity when the hydrometallurgy treatment step S1, the scandium elution step S2, and the scandium extraction step S4 are performed but the impurity extraction step S3 is not performed.

[Scandium Extraction Step S4]
(Reduction Step S41)

Gaseous hydrogen sulfide was blown into the mixture of the raffinate liquid obtained in the impurity extraction step S32 and the post-washing liquid obtained in the scrubbing step S33 to reduce the valence of iron ions contained as impurities from 3 to 2.

(Scandium Extraction Step S42)

(1) Synthesis of amide derivative D2EHAG

As an example of the amide derivative, a glycinamide derivative represented by the general formula (I), namely N—[N,N-Bis(2-ethylhexyl)aminocarbonylmethyl]glycine into which two 2-ethylhexyl groups were introduced (also referred to as N,N-di(2-ethylhexyl) acetamide-2-glycine, hereinafter referred to as "D2EHAG") was synthesized.

Synthesis of D2EHAG was performed as follows. First, as shown in the following reaction formula (V), 23.1 g (0.1 mol) of commercially available di(2-ethylhexyl)amine and 10.1 g (0.1 mol) of triethylamine were fractionated, chloroform was added to and dissolved in this, then 13.5 g (0.12 mol) of 2-chloroacetyl chloride was added thereto dropwise, the mixture was washed with 1 mol/l hydrochloric acid one time and then washed with ion exchanged water, and the chloroform phase was fractionated. Next, an appropriate amount (about 10 to 20 g) of anhydrous sodium sulfate was added thereto, followed by dehydration and filtration to obtain 29.1 g of a yellow liquid. The structure of this yellow liquid (reaction product) was identified by using a nuclear magnetic resonance analyzer (NMR), and it was confirmed that the yellow liquid had the structure of 2-chloro-N,N-di(2-ethylhexyl)acetamide (hereinafter referred to as "CDEHAA"). Note that the yield of CDEHAA was 90% with respect to di(2-ethylhexyl)amine of the raw material.

[Formula 6]

(V)

CDEHAA

Next, as shown in the following reaction formula (VI), 12.72 g (0.04 mol) of CDEHAA was gradually added dropwise to a solution in which 8.0 g (0.2 mol) of sodium hydroxide was added to and dissolved in methanol and 15.01 g (0.2 mol) of glycine was further added thereto while stirring the solution, and the mixture was stirred. After the stirring was terminated, the solvent in the reaction liquid was distilled off, and the residue was added to and dissolved in chloroform. This solution was acidified by addition of 1 mol/l sulfuric acid and then washed with ion exchanged water, and the chloroform phase was fractionated.

An appropriate amount of anhydrous magnesium sulfate was added to this chloroform phase, followed by dehydration and filtration. The solvent was again removed under reduced pressure to obtain 12.5 g of a yellow paste. The yield based on the CDEHAA amount was 87%. The structure of the yellow paste was identified by NMR and elemental analysis, and it was confirmed to have the structure of D2EHAG as illustrated in FIGS. 1 and 2. Through the above steps, an amide derivative D2EHAG as a scandium extractant was obtained.

[Formula 7]

D2EHAG (2) Solvent Extraction of Scandium Contained in Reduced Liquid

With 50 liters of reduced liquid after the reduction step S41 as the extraction starting liquid, 100 liters of an organic solvent in which the concentration of D2EHAG was adjusted to 20 vol % by adding a solvent (SWASOL 1800 manufactured by MARUZEN PETROCHEMICAL CO., LTD.) to D2EHAG was mixed, and the mixture was stirred at room temperature for 60 minutes to perform a solvent extraction treatment, thereby obtaining an organic solvent (second organic phase) containing scandium.

The composition of each element contained in the organic phase extract (second organic phase) obtained by this extraction was analyzed. The percentage of a value obtained by dividing the amount of each element contained in the organic phase extract by the amount of that element contained in the pre-extraction original liquid was calculated and the result is shown in Table 5 as an extraction rate (%).

TABLE 5

| Extraction rates of various elements | Sc | Al | Fe(II) |
|---|---|---|---|
| [%] | 99 | 3 | 8 |

As seen from the results of the extraction rate shown in Table 5, the majority of scandium (Sc) contained in the pre-extraction original liquid (aqueous phase) was partitioned into the organic solvent (second organic phase) and impurities such as Al and Fe which were not able to be separated in the impurity extraction step S3 were able to be separated through the scandium extraction step S42.

[Backward Extraction Step S43]

Subsequently, a 1 mol/L sulfuric acid solution was mixed with the organic phase extract so that the phase ratio O/A became 1/1, the mixture was stirred for 60 minutes to perform the backward extraction step S43, whereby scandium was backward-extracted into an aqueous phase (third aqueous phase).

The compositions of various elements contained in the post-backward extraction liquid obtained by repeating this backward extraction operation 3 times was analyzed. The percentage of a value obtained by dividing the amount of each element contained in the post-backward extraction liquid by the amount of that element extracted into the organic phase in the scandium extraction step S42 was calculated, and the result is shown in Table 6 as a backward extraction rate (%).

TABLE 6

| Backward extraction rates of various elements | Sc | Al | Fe |
|---|---|---|---|
| [%] | 87 | — | — |

(Incidentally, "-" in Table 6 indicates that it is not analyzed or value is less than lower measurement limit.)

As seen from the results of the backward extraction rate shown in Table 6, approximately 100% of the impurities contained in the pre-extraction original liquid was able to be separated and the majority of scandium recoverable from the second organic phase after the scandium extraction step S42 was able to be recovered by performing the solvent extraction treatment described above.

[Scandium Recovery Step S5]
[Enrichment Step S51]

Next, an aqueous solution of sodium hydroxide was added to the resulting backward extraction liquid until the pH reached 6.8 to generate a hydroxide precipitate, and the hydroxide precipitate was thoroughly washed and then dissolved using sulfuric acid, thereby obtaining a starting liquid of the next step.

[Scandium Oxalate Precipitation Step S52]

Next, crystals of oxalic acid dihydrate (manufactured by MITSUBISHI GAS CHEMICAL COMPANY, INC.) in an amount to be two times the amount of scandium contained in the starting liquid in terms of calculated amount were dissolved in the resulting starting liquid, and the mixture was stirred and mixed for 60 minutes to generate a white crystalline precipitate of scandium oxalate. The pH of the solution at this time was 1.0.

[Roasting Step S53]

Next, the resulting precipitate of scandium oxalate was filtered by aspiration, and washed with pure water, and was dried at 105° C. for 8 hours. Then, the dried scandium oxalate was placed in a tubular furnace, and maintained at 1100° C. to perform roasting (calcination), thereby obtaining scandium oxide.

The compositions of various elements contained in the starting liquid obtained in the enrichment step S51 and the compositions of various elements contained in the scandium oxide obtained by roasting were analyzed by emission spectroscopic analysis. Table 7 shows the removal rates (%) obtained by dividing the amounts of various components after roasting by the amounts of various components before being subjected to the scandium oxalate precipitation step S52 (that is, contained in the starting liquid obtained in the enrichment step S51).

TABLE 7

| Removal rates of various elements | Sc | Al | Fe(II) | Others |
|---|---|---|---|---|
| [%] | 0 | 100 | 100 | 99.9 |

As seen from the results of the removal rates in Table 7, aluminum, iron, and other impurities other than scandium were able be removed almost completely, and ultra high purity scandium oxide in which the purity as scandium oxide ($Sc_2O_3$) was more than 99.9 wt % was able to be obtained.

Comparative Example 1

The scandium recovery step S5 was performed according to the same approach as used in Example 1 except that the amount of oxalic acid dihydrate to be added to the scandium eluate obtained through the hydrometallurgy treatment step S1 and the scandium elution step S2 was an amount to be 1.2 times the amount of scandium contained in the starting liquid in terms of calculated amount and the pH of the solution after addition of oxalic acid was 0. Then, the grade (purity) of scandium contained in the scandium oxide after roasting (calcination) was measured.

As a result, impurity components including aluminum and iron were able to be approximately completely separated and a purity of 99.9 wt % or more as scandium oxide ($Sc_2O_3$) after roasting was able to be secured, but the actual yield was lower than that by the method of Example 1 in which the solvent extraction treatment and the oxalate-formation treatment were combined.

Note that the scandium eluate contains iron and aluminum in addition to scandium in the case of Comparative Example 1. Therefore, when the amount of oxalic acid dihydrate to be added and the pH of the solution after addition of oxalic acid are set to the same conditions as in Example 1 in the scandium recovery step S5 in preference to the actual yield, iron and aluminum are also contained in the precipitate of scandium oxalate. Consequently, it is impossible to obtain a high grade (purity) as high as in Example 1.

<Test Example 2> Optimization of Scandium Extraction Step S4

[Test Example 2-1] Effect of Reduction Step S41

In order to verify the effect of reduction step S41, the extraction behavior of scandium, divalent iron, and trivalent iron when using D2EHAG was investigated.

Several kinds of acidic solutions by sulfuric acid which contained scandium, divalent iron, and trivalent iron at $1\times10^{-4}$ mol/l, respectively, and had a pH adjusted to 1.1 to 7.9 were prepared and used as an original liquid. Note that divalent iron was prepared using ferrous sulfate and trivalent iron was prepared using ferric sulfate.

A n-dodecane solution which contained 0.01 mol/l D2EHAG and had the same volume as the original liquid was added into a test tube containing the original liquid and the test tube was placed in a thermostatic chamber at 25° C.

and shaken for 24 hours. At this time, the pH of the sulfuric acid solution was adjusted to be constant using 0.1 mol/l sulfuric acid, ammonium sulfate, and ammonia.

Figure 3:
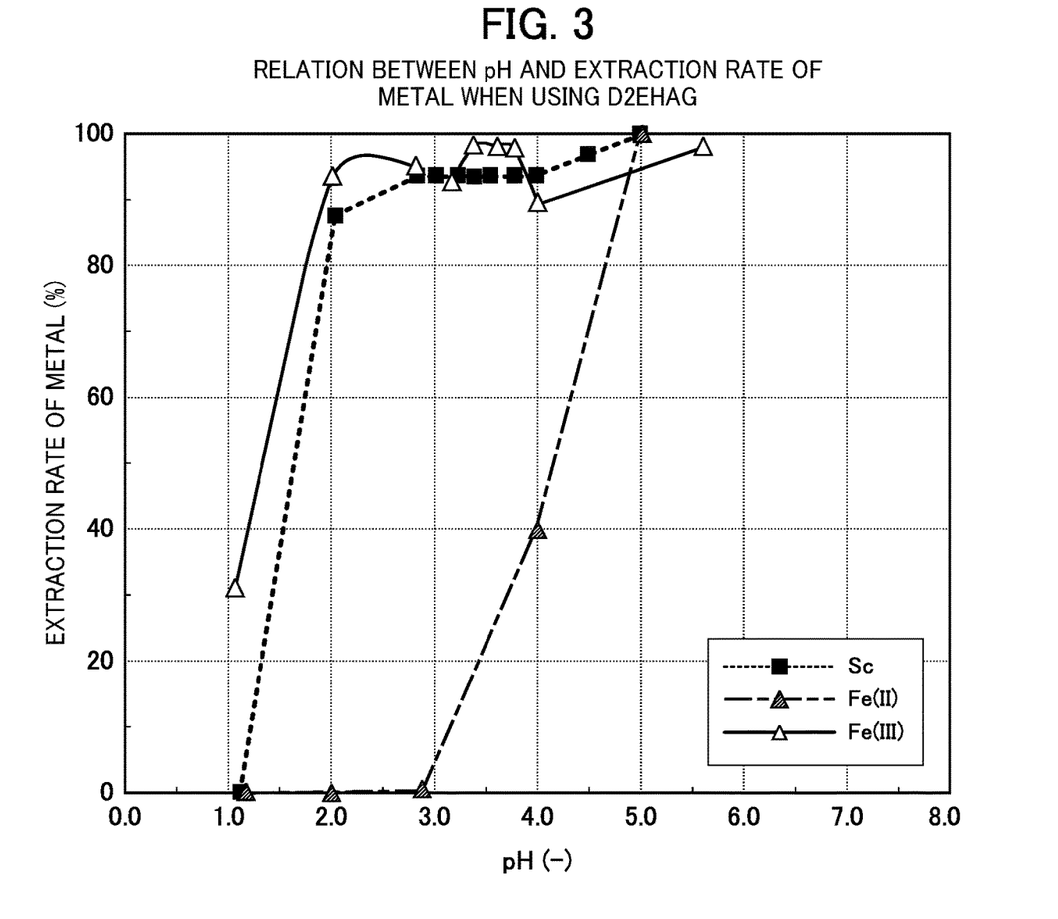
FIG. 3 is a graphic representation showing the relation between the pH and the extraction rate when an acidic solution containing scandium, divalent iron and trivalent iron is subjected to a solvent extraction treatment using an organic solvent containing an amide derivative D2EHAG.

After shaking, the organic phase was backward-extracted using 1 mol/l sulfuric acid. Then, the concentration of each component contained in the original liquid in the backward extraction phase was measured by using an inductively coupled plasma-atomic emission spectrometer (ICP-AES). From the results of this measurement, the extraction rate of each component contained was defined by the amount of substance in organic phase/(amount of substance in organic phase+amount of substance in aqueous phase) and determined. The results are shown in FIG. 3. In FIG. 3, the horizontal axis represents the pH of the acidic solution by sulfuric acid and the vertical axis represents the extraction rates (unit: %) of various components contained in the original liquid.

From FIG. 3, it can be seen that extraction behavior of divalent iron and extraction behavior of trivalent iron are different from each other. An acidic solution containing scandium and divalent iron can be separated into an organic phase containing scandium and an aqueous phase containing divalent iron by performing a solvent extraction treatment using D2EHAG while adjusting the pH to 1.2 or more and 4.5 or less.

On the other hand, with regard to an acidic solution containing scandium and trivalent iron, trivalent iron is also extracted into the organic phase in a region in which scandium can be extracted into the organic phase and thus the acidic solution containing scandium and trivalent iron cannot be subjected to a solvent extraction treatment using D2EHAG.

Therefore, in order to efficiently remove iron ions contained in the original liquid, it is preferable to perform the reduction step S41 of reducing trivalent iron contained in the original liquid to divalent iron before performing the scandium extraction step S42 using D2EHAG.

[Test Example 2-2] Optimum pH of Original Liquid Before Scandium Extraction (Extraction Starting Liquid) in Scandium Extraction Step S42

The hydrometallurgy treatment step S1, the scandium elution step S2, the impurity extraction step S3, and the reduction step S41 were performed according to the same approach as used in Example 1. Through these steps, an original liquid before scandium extraction having the composition shown in Table 8 was obtained.

TABLE 8

| Composition of pre-extraction original liquid | Sc | Al | Fe (III) | Others |
|---|---|---|---|---|
| [mg/L] | 12,000 | 2,700 | 2,800 | 980 |

The original liquid before scandium extraction (extraction starting liquid) having the composition shown in Table 8 was subjected to the scandium extraction step S42 using an organic solvent containing D2EHAG. As in Example 1, the organic solvent is SWASOL 1800 manufactured by MARUZEN PETROCHEMICAL CO., LTD. and the concentration of D2EHAG is 20 wt %. The amount of organic solvent (O) and the amount of extraction starting liquid (A) were set to be O/A=2, and the extraction equilibrium pH was selected as in the extraction conditions shown in Table 9.

TABLE 9

| | Organic liquid amount [ml] | Aqueous phase liquid amount [ml] | O/A | pH |
|---|---|---|---|---|
| Test Example 2-2-1 | 100 | 50 | 2 | 1.0 |
| Test Example 2-2-2 | 100 | 50 | 2 | 2.0 |
| Test Example 2-2-3 | 100 | 50 | 2 | 3.0 |

Figure 4:
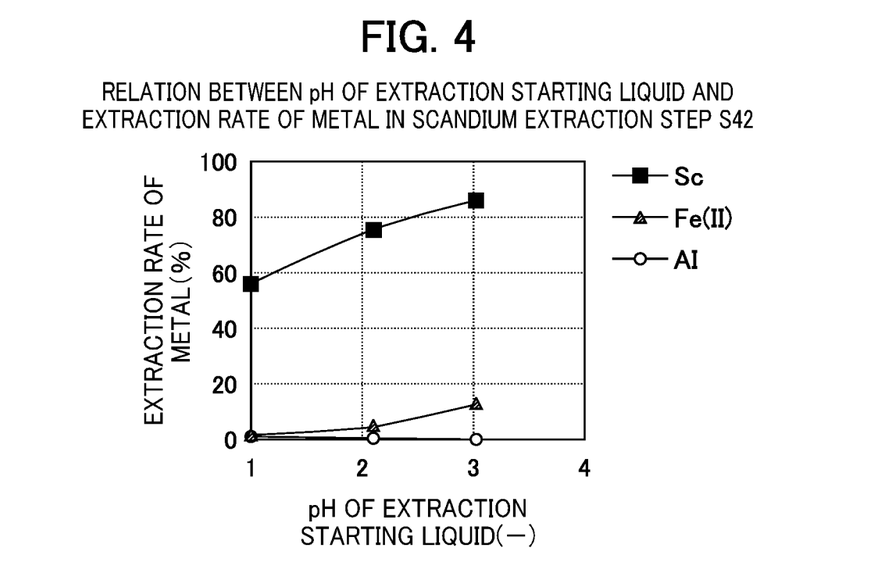
FIG. 4 is a graphic representation showing the relation between the pH of the extraction starting liquid and the extraction rates of Sc, Fe(II), and Al in the scandium extraction step S42 using an organic solvent containing an amide derivative D2EHAG.

FIG. 4 is a graphic representation showing the results on the extraction rates (%) of Sc, Al, and Fe(II) contained in the organic solvent (second organic phase) after the solvent extraction. Note that the extraction rate was defined by the percentage of a value obtained by dividing the amount of each element contained in the organic phase extract by the amount of that element contained in the pre-extraction original liquid.

As seen from the graphic representation shown in FIG. 4, when the pH is 1.0, scandium and other impurities can be efficiently separated from each other, and as a result, it has been found that scandium can be selectively extracted into the post-extraction organic solvent. Specifically, when the pH was 1.0, the extraction rate of scandium was 56% while the extraction ratios of impurities were each less than 3%.

Further, it has been confirmed that it is preferable to add an organic solution of an extractant while adjusting the pH of the acidic aqueous solution containing scandium to 2.5 or less and more preferably 1.5 or less in order to efficiently recover scandium from an acidic aqueous solution containing scandium and impurities (mainly divalent iron and aluminum).

[Test Example 2-3] Optimum Concentration of Sulfuric Acid to be Used in Scandium Backward Extraction Step S43

The second organic phase obtained in Test Example 2-2-1 was mixed with sulfuric acid and subjected to the backward extraction step S43. Table 10 shows the concentration conditions of sulfuric acid used in the backward extraction.

TABLE 10

| | Concentration of sulfuric acid [mol/L] |
|---|---|
| Test Example 2-3-1 | 0.01 |
| Test Example 2-3-2 | 0.1 |
| Test Example 2-3-3 | 1.0 |
| Test Example 2-3-4 | 2.0 |

Figure 5:
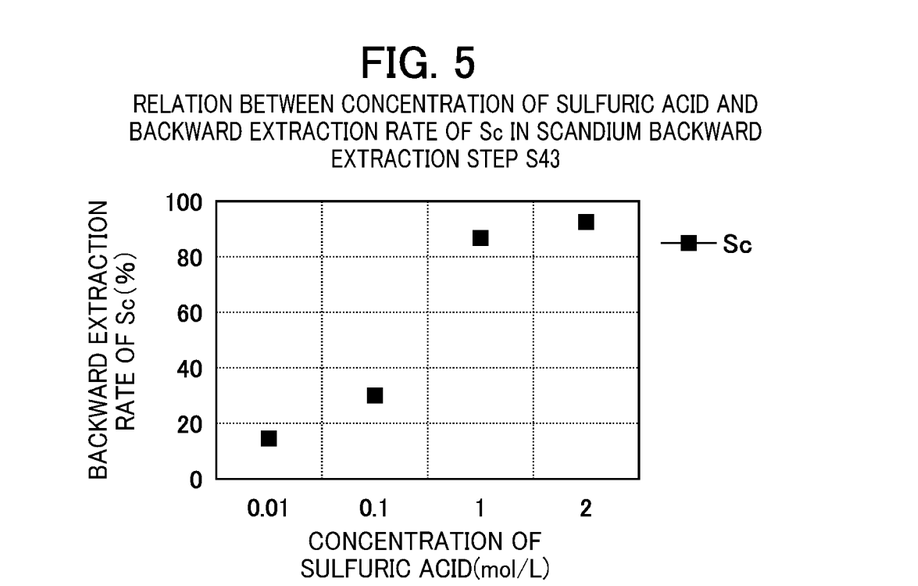
FIG. 5 is a graphical representation showing the relation between the concentration of the backward extraction liquid (sulfuric acid) and the proportion of scandium contained in the post-backward extraction liquid in the scandium backward extraction step S43.

FIG. 5 is a graphical representation showing the relation between the concentration of sulfuric acid used for the backward extraction and the backward extraction rate of scandium. Here, the backward extraction rate refers to the proportion of a metal which was separated from the organic solvent and contained in sulfuric acid.

It has been confirmed from the graphical representation shown in FIG. 5 that it is preferable to set the sulfuric acid concentration to 1 mol/L or more in order to obtain a high yield.

EXPLANATION OF REFERENCE NUMERALS

S1 HYDROMETALLURGY TREATMENT STEP
S2 SCANDIUM ELUTION STEP
S3 IMPURITY EXTRACTION STEP

S4 SCANDIUM EXTRACTION STEP
S5 SCANDIUM RECOVERY STEP

The invention claimed is:

1. A method for recovering scandium, comprising:
an adsorption step of passing a solution containing scandium through an ion exchange resin to adsorb the scandium to the ion exchange resin;
an elution step of passing a sulfuric acid solution through the ion exchange resin to elute the scandium from the ion exchange resin and to obtain a post-elution solution containing scandium;
an impurity extraction step of subjecting the post-elution solution containing scandium to solvent extraction using an amine-based impurity extractant to separate the solution into an aqueous phase containing scandium and an organic phase containing impurities after the elution step; and
a scandium extraction step of subjecting the aqueous phase containing scandium to solvent extraction using a scandium extractant containing an amide derivative to separate the aqueous phase into an aqueous phase containing impurities and an organic phase containing scandium.

2. The method for recovering scandium according to claim 1, further comprising an enrichment step of enriching the post-elution solution after the elution step,
wherein the impurity extraction step is performed after the enrichment step.

3. The method for recovering scandium according to claim 1, wherein the aqueous phase containing scandium contains trivalent iron as an impurity,
the method further comprises a reduction step of reducing the trivalent iron contained in the aqueous phase containing scandium to divalent iron after the impurity extraction step, and
the scandium extraction step is performed after the reduction step.

4. The method for recovering scandium according to claim 1, further comprising a scandium backward extraction step of subjecting the organic phase containing scandium to backward extraction to obtain a scandium backward extraction liquid.

5. The method for recovering scandium according to claim 4, further comprising:
a precipitation step of adding oxalic acid to the scandium backward extraction liquid to precipitate scandium oxalate; and
an oxidation step of oxidizing the scandium oxalate to obtain scandium oxide.

6. The method for recovering scandium according to claim 1, wherein the amide derivative is represented by the following formula:

(I)

wherein $R^1$ and $R^2$ each represent the same alkyl or different alkyl groups and are linear or branched, $R^3$ represents a hydrogen atom or an alkyl group, and $R^4$ represents a hydrogen atom or an arbitrary group other than an amino group, which is bonded to an α carbon as an amino acid.

7. The method for recovering scandium according to claim 1, wherein the solution to pass through the ion exchange resin in the adsorption step is an acid solution obtained by leaching nickel oxide ore using sulfuric acid at high temperature and high pressure.

8. The method for recovering scandium according to claim 2, wherein the aqueous phase containing scandium contains trivalent iron as an impurity,
the method further comprises a reduction step of reducing the trivalent iron contained in the aqueous phase containing scandium to divalent iron after the impurity extraction step, and
the scandium extraction step is performed after the reduction step.

9. The method for recovering scandium according to claim 2, further comprising a scandium backward extraction step of subjecting the organic phase containing scandium to backward extraction to obtain a scandium backward extraction liquid.

10. The method for recovering scandium according to claim 3, further comprising a scandium backward extraction step of subjecting the organic phase containing scandium to backward extraction to obtain a scandium backward extraction liquid.

11. The method for recovering scandium according to claim 2, wherein the amide derivative is represented by the following formula:

(I)

wherein $R^1$ and $R^2$ each represent the same alkyl or different alkyl groups and are linear or branched, $R^3$ represents a hydrogen atom or an alkyl group, and $R^4$ represents a hydrogen atom or an arbitrary group other than an amino group, which is bonded to an α carbon as an amino acid.

12. The method for recovering scandium according to claim 3, wherein the amide derivative is represented by the following formula:

(I)

wherein $R^1$ and $R^2$ each represent the same alkyl or different alkyl groups and are linear or branched, $R^3$ represents a hydrogen atom or an alkyl group, and $R^4$ represents a hydrogen atom or an arbitrary group other than an amino group, which is bonded to an α carbon as an amino acid.

13. The method for recovering scandium according to claim 4, wherein the amide derivative is represented by the following formula:

wherein R¹ and R² each represent the same alkyl or different alkyl groups and are linear or branched, R³ represents a hydrogen atom or an alkyl group, and R⁴ represents a hydrogen atom or an arbitrary group other than an amino group, which is bonded to an α carbon as an amino acid.

14. The method for recovering scandium according to claim 5, wherein the amide derivative is represented by the following formula:

wherein R¹ and R² each represent the same alkyl or different alkyl groups and are linear or branched, R³ represents a hydrogen atom or an alkyl group, and R⁴ represents a hydrogen atom or an arbitrary group other than an amino group, which is bonded to an α carbon as an amino acid.

15. The method for recovering scandium according to claim 2, wherein the solution to pass through the ion exchange resin in the adsorption step is an acid solution obtained by leaching nickel oxide ore using sulfuric acid at high temperature and high pressure.

16. The method for recovering scandium according to claim 3, wherein the solution to pass through the ion exchange resin in the adsorption step is an acid solution obtained by leaching nickel oxide ore using sulfuric acid at high temperature and high pressure.

17. The method for recovering scandium according to claim 6, wherein the solution to pass through the ion exchange resin in the adsorption step is an acid solution obtained by leaching nickel oxide ore using sulfuric acid at high temperature and high pressure.

18. A method for recovering scandium, comprising:
an adsorption step of passing a solution containing scandium through an ion exchange resin to adsorb the scandium to the ion exchange resin;
an elution step of passing a sulfuric acid solution through the ion exchange resin to elute the scandium from the ion exchange resin and to obtain a post-elution solution containing scandium;
a scandium extraction step of subjecting the post-elution solution containing scandium to solvent extraction using a scandium extractant containing an amide derivative to separate the solution into an aqueous phase containing impurities and an organic phase containing scandium after the elution step;
a scandium backward extraction step of subjecting the organic phase containing scandium to backward extraction to obtain a scandium backward extraction liquid; and
an impurity extraction step of subjecting the scandium backward extraction liquid to solvent extraction using an amine-based impurity extractant to separate the scandium backward extraction liquid into an aqueous phase containing scandium and an organic phase containing impurities.

19. The method for recovering scandium according to claim 18, wherein the amide derivative is represented by the following formula:

wherein R¹ and R² each represent the same alkyl or different alkyl groups and are linear or branched, R³ represents a hydrogen atom or an alkyl group, and R⁴ represents a hydrogen atom or an arbitrary group other than an amino group, which is bonded to an α carbon as an amino acid.

20. The method for recovering scandium according to claim 18, wherein the solution to pass through the ion exchange resin in the adsorption step is an acid solution obtained by leaching nickel oxide ore using sulfuric acid at high temperature and high pressure.

* * * * *